United States Patent [19]

Van Duuren

[11] 3,752,612

[45] Aug. 14, 1973

[54] APPARATUS FOR THE CONTINUOUS PRODUCTION OF TUBULAR FILM FROM THERMOPLASTIC SYNTHETIC RESINS

[75] Inventor: Antony Van Duuren, Velp (Gld.), Netherlands

[73] Assignee: Akzo N.V., Arnhem, Netherlands

[22] Filed: May 18, 1971

[21] Appl. No.: 144,101

[30] Foreign Application Priority Data
June 3, 1970 Netherlands...................... 7008028

[52] U.S. Cl...................... 425/66, 264/95, 425/327
[51] Int. Cl. .......................... B29c 1/04, B29d 7/14
[58] Field of Search ................ 264/95; 425/66, 327, 425/326

[56] References Cited
UNITED STATES PATENTS
3,469,282  9/1969  Barnes ................................ 425/327
3,335,208  8/1967  Harris .................................. 264/95
3,296,352  1/1967  Riggs ............................. 264/95 X
3,468,995  9/1969  Nelson .............................. 264/95

FOREIGN PATENTS OR APPLICATIONS
673,305  10/1963  Canada .............................. 425/66

Primary Examiner—J. Spencer Overholser
Assistant Examiner—Ben D. Tobor
Attorney—Stevens, Davis, Miller & Mosher

[57] ABSTRACT

An apparatus for the production of wrinkle-free tubular films from thermoplastic synthetic resins is disclosed. The apparatus comprises an extruder, at least one guide surface, and haul-off rolls. The guide surface is covered with a layer of synthetic resin containing at least 0.5% glass fiber. The presence of the glass fiber in the synthetic resin produces a somewhat granular surface which minimizes or eliminates wrinkling in the extruded film.

1 Claim, 1 Drawing Figure

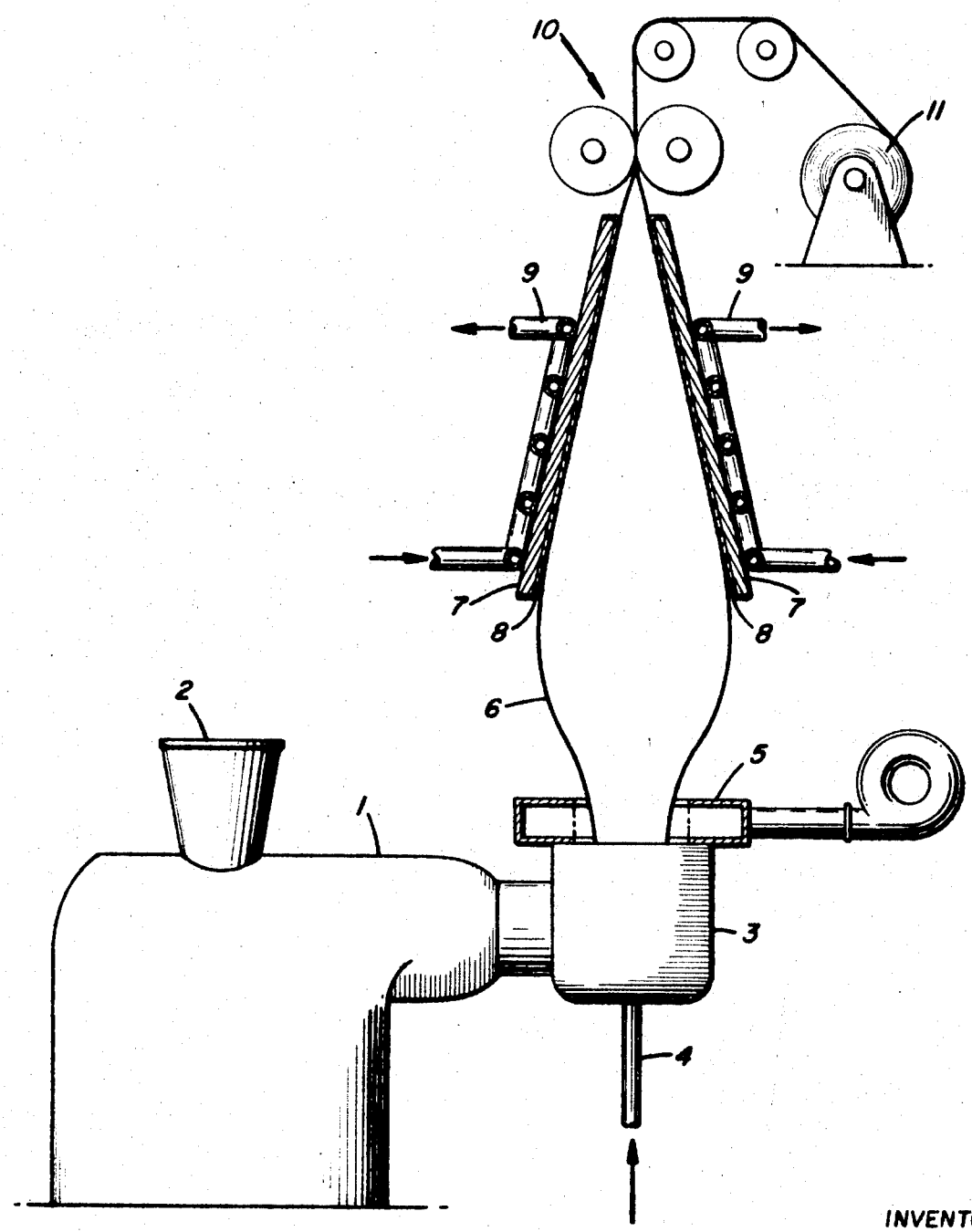

APPARATUS FOR THE CONTINUOUS PRODUCTION OF TUBULAR FILM FROM THERMOPLASTIC SYNTHETIC RESINS

The invention relates to an apparatus for the continuous manufacture of tubular film from thermoplastic synthetic resin. This apparatus comprises an extruder, one or more guide surfaces for flattening the extruded film, and a pair of haul-off rolls. The guide surfaces are covered with a synthetic resin layer.

An apparatus of the above-indicated type is described in U.S. Pat. No. 3,335,208. The prior art apparatus has flat surfaces for guiding the tubular film which are positioned intermediate to the extrusion orifice and the haul-off rolls. These surfaces so guide the tubular film that its round cross-section gradually changes into a more rectangular cross-section which is further flattened as the film moves to the haul-off rolls, where it is formed into an endless double thickness tubing. According to the above-cited patent, the friction between the hot, still plastic film and the guide surfaces may be reduced by covering these surfaces with a smooth sheet of a synthetic resin, such as tetrafluorethylene. The object thereof is to avoid deformation of the tubular shape of the film in order that it may be wound into a wrinkle-free product.

In the guiding arrangement according to the above United States Patent, the tubular film is not equally supported over its entire circumferential surface. The flat guide surfaces are only in contact with the film over part of its circumference.

Especially in the stage where the film still has a flattened circular or elliptical shape and is still insufficiently strong, it is possible that locally engaging frictional forces and the pulling force exerted by the haul-off rolls readily give rise to the formation of ripples which are flattened into creases between said rolls. It is apparent that an unusable product is obtained by this method.

Such a disadvantage becomes more serious with increasing friction between the film and the guide surfaces. This friction is partly dependent on the type of thermoplastic synthetic resin used to form the film.

In the extrusion of tubular polyethylene film by conventional methods, no excessive rippling is encountered. This may be attributed to the favorable sliding property of the polyethylene surface when in contact with the guide surfaces.

With a number of other artificial resins, however, the friction between film extruded therefrom and the guide surfaces is so high that wrinkle-free production by known techniques is either impossible or else the production is disturbed to a great extent causing part of the product to be rejected. This happens, for example, with films from polyesters or polyamides. Particularly, polyamide film has an unsmooth surface while being extruded. The resulting film is stiff and hard.

Accordingly, an object of the invention is to provide an apparatus of the above-described type wherein there is a reduced chance of the formation of wrinkles and creases.

The invention consists in that the covering layer of the guide surface contains at least 0.5% glass fiber. Surprisingly, it has been found that there is considerably less friction between these surfaces and the extruded tubular film. Even stiff films, such as polyamides and polyesters, can be obtained in a wrinkle-free state. A synthetic resin layer containing more than 0.5% glass fiber has a somewhat granular surface which is nevertheless smooth. The glass fibers are entirely covered with synthetic resin. Such a layer may be formed by spraying the material onto a guide surface.

The glass fibers used for the layer may be of the type employed in the usual process of reinforcing synthetic resins. A suitable glass fiber has an average length of 0.4 mm and an average diameter of 10 microns.

In the extrusion of tubular polyamide film, it has been found advantageous to use a polyamide sheet as a coating layer. Such a sheet may be mounted on the guide surfaces or on a frame. When the sheet gets dirty or damaged, it can very easily be replaced. The type of synthetic resin employed is not critical to the success of the invention; conventional film forming materials can be used.

Because of the high strength of the polyamide sheet material, the covering sheet may mostly be relatively thin. A suitable sheeting material may, for instance, have a weight of 300 grams per $m^2$ and contain 2% glass fiber. Another suitable polyamide sheeting material may, for instance, have a weight of 300 grams per $m^2$ and contain 15% glass fiber. The invention will be further described with reference to the accompanying figure.

The FIGURE represents a vertical extruder.

In the figure, the numeral 1 refers to an extruder with a hopper 2. At the head of the extruder is an extrusion die 3 connected to an air supply line 4. The apparatus also comprises an additional cooling device 5 in which cold air is blown onto the outside of a film 6. Two opposed guide plates are referred to by the numeral 7. These plates are covered with a polyamide layer 8 containing 2% glass fiber. On the side remote from the film 6, these plates are cooled by cooling spirals 9. Via the haul-off rolls 10, the solidified and flattened tubular film 6 is guided to a winding device 11.

What is claimed is:

1. An apparatus for the continuous manufacture of tubular film from thermoplastic synthetic resin comprising
    an extruder,
    at least one fired guide surface for flattening the extruded film, and
    a pair of haul-off rolls, wherein said guide surface is covered with a layer of synthetic resin, wherein said resin layer consists essentially of polyamide, and contains at least 0.5% glass fiber.

* * * * *